July 31, 1945.   C. F. PROUDMAN   2,380,465
SYSTEM OF AERATION
Filed Feb. 14, 1939   2 Sheets-Sheet 1

INVENTOR
CHESTER F. PROUDMAN
BY Mathias R. Kondolf
ATTORNEY

July 31, 1945.   C. F. PROUDMAN   2,380,465
SYSTEM OF AERATION
Filed Feb. 14, 1939   2 Sheets-Sheet 2

INVENTOR
CHESTER F. PROUDMAN
BY *Mathias R. Kondolf*
ATTORNEY

Patented July 31, 1945

2,380,465

UNITED STATES PATENT OFFICE 2,380,465

SYSTEM OF AERATION

Chester F. Proudman, New Canaan, Conn.

Application February 14, 1939, Serial No. 256,276

3 Claims. (Cl. 210—8)

This invention relates to apparatus and methods used in the activated sludge treatment of sewage and analogous liquids.

In the customary activated sludge treatment of sewage, the raw sewage is initially passed over settling beds or through screening apparatus to remove the heavier and more solid materials. The liquid component, or primary effluent, flows into open tanks where it is mixed with activated sludge for the purpose of "seeding" or starting the action of the bacteria. In order to supply oxygen and propagate the aerobic bacteria, air is caused to bubble through the liquid and is dispersed to the atmosphere immediately above the tank. Various devices to agitate the liquid and secure better aeration are used. The action of the bacteria purifies the liquid in the tank and with the proper conditions a vigorous growth of the aerobic bacteria is obtained.

From the aerating tank the liquid, containing the activated sludge, passes to a settling tank. From this tank the liquid in more or less purified condition, is drawn off. A portion of the sediment or activated sludge is mixed with the incoming primary effluent for seeding purposes and the remainder goes to the digesters with the initial screenings taken from the system.

A major source of trouble in the customary operation of activated sludge systems is the "bulking" of the sludge, which condition interferes with proper aeration.

The quantity of air required in operating the customary system is approximately two cubic feet of air per gallon of liquid treated and the furnishing of this quantity of air is a large item of expense. It is estimated that only ten percent of the available oxygen in the air is utilized by present methods, the remaining ninety percent being wasted.

This invention is particularly directed to the intermediate treatment of the primary effluent between the primary effluent channel and the settling tanks.

The general objects of this invention are to provide apparatus and methods which will increase the efficiency of the purifying plant, reduce the cost of operation and provide better control.

A principal object of this invention is the provision of closed tanks to enable the same air to be passed through the liquid in successive tanks and thereby obtain additional aeration from a given volume of air.

A further object of this invention is to provide covered tanks which may be maintained under pressure to secure a higher percentage of dissolved oxygen in the liquid undergoing treatment.

A further object of this invention is to provide covered tanks not requiring internal moving parts or objectionable sludge accumulating baffles, jogs or partitions to secure the necessary aeration.

A further object of this invention is to provide definite control of the volume of liquid to be treated so that proper purification is effected under all conditions.

A further object of this invention is to prevent "short circuiting" of the tanks whereby portions of the liquid may not receive proper aeration or bacterial action.

A further object of this invention is to reduce and practically eliminate "bulking" of the activated sludge.

A further object of this invention is to supply the proper quantity of air to the tanks in accordance with the biochemical oxygen demand as determined by tests for dissolved oxygen.

A further object of this invention is the provision for culture control in separate tanks, whereby the final activated sludge obtained will be in the most vigorous condition and best adapted for seeding purposes.

A further object of this invention is the provision of two or more series of tanks to secure continuous operation.

A further object of this invention is to provide for a plurality of connected tanks, each under individual control and each progressively increasing the activation or vigor of the bacterial content of the sludge entrained with the liquid passing through said tanks.

A further object of this invention is the provision of automatic valves, controlled by a conventional timing mechanism, to effect batch control of the tanks.

To these and other ends the characteristic features and advantages of my improvement will more fully appear in the following description and the accompanying drawings in illustration thereof.

In the drawings in which like reference numerals designate like parts

Figure 1:
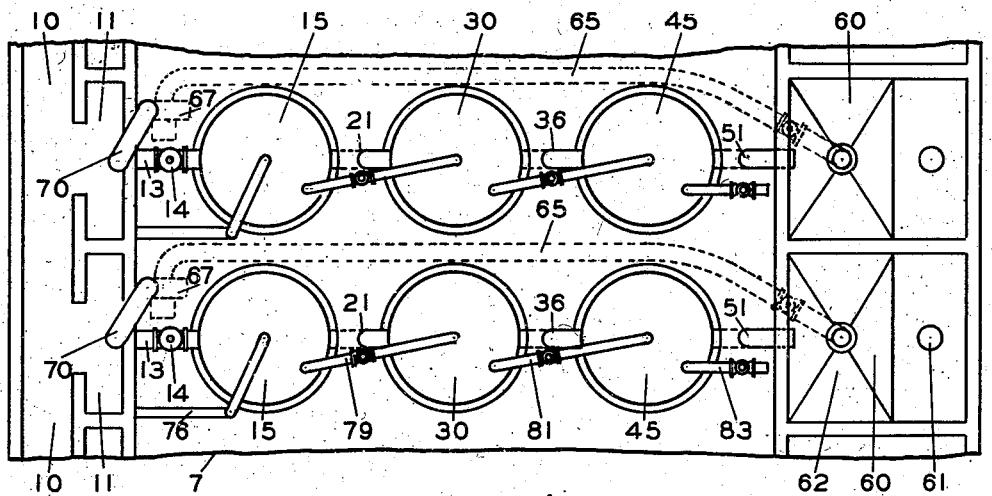
Fig. 1 is a general plan view of the parts of an aerating and purifying plant coming within the scope of this invention.

Referring to Fig. 1, reference numeral 10 designates a portion of a channel in which the primary effluent from the primary settling beds or screening apparatus is received. 11 is a weir or mixing chamber adjacent to and connected with the channel 10 and into which the activated sludge used for seeding purposes is conveyed through the pipe 70. 13 is the inlet pipe carrying the primary effluent plus the activated sludge into the first tank 15. A valve 14 controls the flow through the pipe 13. The tank 15 is provided with the side walls 16, a closed top 17 and a bottom 18, preferably hopperlike in shape.

At the bottom of the tank 15 is the opening 20 connecting with the exit pipe 21 which is provided with the valve 22. The pipe 21 connects the tank 15 to the tank 30, the next successive tank in the series.

It will be understood that the effluent channel and the several tanks may be arranged to meet specific plant conditions. For purposes of description the foundation 5 having the walls 6 and the subfloors 7 and 8 are shown as housing and supporting the channel 10 and the tanks 15, 30, 45 and 60 which comprise the apparatus of the invention.

The tank 30 is similar to the tank 15 and comprises the side walls 31, the top 32 and the bottom 33. At the bottom of the tank 30 is the opening 35 connecting with the exit pipe 36 having the valve 37. The pipe 36 connects the tank 30 to the tank 45, the next successive tank in the series.

The tank 45 is similar to the tanks 15 and 30 and comprises the side walls 46, the top 47 and the bottom 48. At the bottom of the tank 45 is the opening 50 connecting with the exit pipe 51 having the valve 52 and connecting the tank 45 to the settling tank, or basin, 60.

It will be understood that the tank tops 17, 32 and 47 are removable for access to the inside of the tanks.

The settling basin 60 may be of conventional construction and may be open at the top. It is provided with a pipe 61, to withdraw purified liquid, and a hopper bottom 62 into which the activated sludge settles. The tank 60 has a valved drain 63. The bottom outlet 64 connects through the discharge pipe 65, and valve 66, with the sludge pump 67. The outlet 68 of the sludge pump 67 is divided, one branch, the pipe 70 discharges activated sludge into the mixing weir 11. The other branch, the pipe 69, leads to the screen apparatus or digesters and disposes of the surplus activated sludge, which is not used for seeding purposes.

For the purpose of supplying air to the tanks a source of compressed air 75, normally consisting of an air compressor and a storage tank, is provided. This compressor may be driven in any convenient manner. One air compressor, as at 75, will supply air for a number of tanks and it will be understood that suitable pipe connections will be made to accomplish this.

Figure 2:
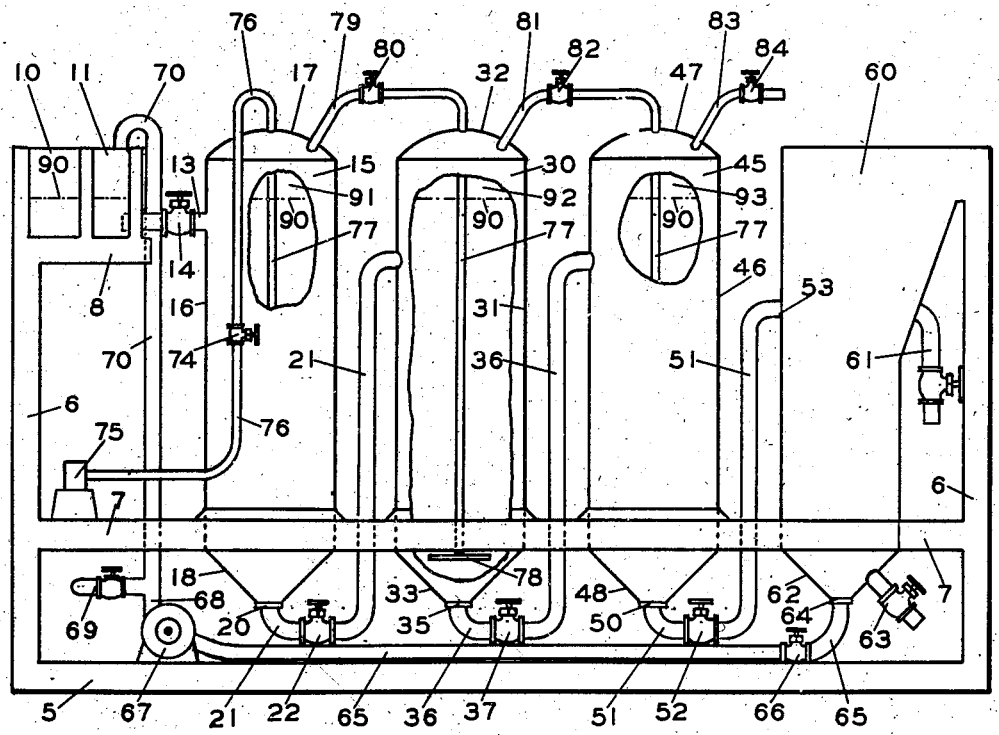
Fig. 2 is a side elevation, partly broken away, of the apparatus of Fig. 1.

The pipe 76 having the valve 74 connects the source of compressed air 75 with the tank 15. The air pipe 76 has a leg 77 extending downwardly into the tank 15. At the end of the leg 77, and in proximity to the bottom of the tank 15, is a conventional porous block 78 as shown through the cut away section of tank 30 in Fig. 2 and in Fig. 3.

The porous blocks 78 are attached to the ends of the legs 77 in such a manner as to cause the air forced through the legs to diffuse through the blocks and in operation bubble upwardly through the liquid in minute bubbles. From the space, or air dome 91, at the top of the tank 15 the air pipe 79 having a valve 80 connects with a leg 77 which extends downwardly into the tank 30. The leg 77 in the tank 30 carries a similar diffusion block 78 as described in connection with tank 15. From the space, or air dome 92, at the top of the tank 30, the air pipe 81 having a valve 82 connects with a leg 77 which extends downwardly into the tank 45. The leg 77 in the tank 45 carries a similar diffusion block 78 as described in connection with tanks 15 and 30. From the space, or air dome 93, near the top of tank 45 is connected an exhaust pipe 83 having the valve 84. The pipe 83 exhausts through the valve 84 into the atmosphere.

The openings in the tank tops 17, 32 and 47, for the passage of the legs 77 into the tanks, are sealed about the legs 77 to hold the pressure within the tanks.

The method of use of the apparatus shown and described is as follows, it being understood that an initial charge of activated sludge is placed in the hopper 62 of the tank 60.

Primary effluent passes from the channel 10 into the weir 11. Activated sludge is withdrawn from the tank 60, and by means of the sludge pump 67 and the pipe 70, a suitable quantity for seeding purposes is conveyed to the weir 11 and mixes with the effluent passing through the weir. The mixture of effluent and activated sludge flows through the pipe 13 and the valve 14 into the tank 15, and reaches the liquid level of the apparatus as shown by the dot and dash line 90 in Fig. 2. The mixture of primary effluent and activated sludge will pass through the pipe 21, the valve 22 and into the tank 30 until it reaches the liquid level line 90. In starting the operation of the plant the valve 37 will be closed and therefore the tank 45 will remain empty. Compressed air from the source is now fed through the pipe 76, the leg 77 and the diffusion block 78 into the tank 15 and, as described above, will rise through the liquid in the tank 15 to the air dome or space 91 above the liquid level in the tank.

When an air pressure is built up sufficiently in the dome 91 of the tank 15 the air will be forced through the pipe 79, the valve 80 and down through the leg 77 in the tank 30 and, as described above, will bubble upwardly from the diffusion block 78 and through the liquid in the tank 30, accumulating in the space or air dome 92 above the liquid in the tank 30. From the air dome 92 the air will be forced through the pipe 81, the valve 82, and the leg 77 into the tank 45 and upwardly through the tank 45 into the upper space or air dome 93 in the top of the tank 45, and then outwardly through the exhaust pipe 83 and open valve 84 to the atmosphere. In starting, the apparatus is run with the two tanks for a period until the bacterial action has secured the desired purification of the liquid in the tanks 15 and 30.

The air valve 74 in the pipe 76 is now closed. The valves 22, 37, 52 and 66 are opened, the sludge pump 67 is started and activated sludge is fed from the hopper 62 of the tank 60, through the pipes 65 and 70 to the mixing weir 11. The valve 14 is opened and primary effluent mixed with activated sludge is fed through the pipe 13 into the tank 15.

Since the tanks 15 and 45 are of similar capacity, a batch of liquid fed to the tank 15, and having a volume equal to tank 15, will result in the three tanks being filled with liquid up to the liquid level line 90.

After the new batch has been taken into the tank 15 the sludge pump 67 is stopped, the valves 66, 14, 22, 37 and 52 are closed and the air valve 74 opened.

It will now be noted that the tank 15 is filled with primary effluent in an unpurified state mixed with activated sludge, while tanks 30 and 45 are filled with a more purified liquid mixed with activated sludge.

The air supply is passed through the tanks as above described and the treatment is continued for the desired length of time so that the liquid in tank 45 will become purified to the point desired.

At this point the operating cycle of the apparatus may be considered to be completely started.

The air valve 74 is now closed, and the valves 66, 14, 22, 37 and 52 are opened. The sludge pump 67 is started and a new batch of primary effluent plus activated sludge flows into the tank 15 from the mixing weir 11. The discharge end 53 of the pipe 51 is lower than the level of the liquid in the tank 45 and lower than the pipe 13 entering the tank 15. Therefore, when the valve 52 is opened the liquid will flow out of the tank 45 into the tank 60, and this in turn will cause liquid to flow into the tank 45 from the tank 30, thereby lowering the liquid level in the tank 30. The lower liquid level in the tank 30 will in turn cause liquid to flow from the tank 15 into the tank 30 and the new batch entering the tank 15 will take the place of the liquid which passes into the tank 30.

The valves 66, 14, 22, 37 and 52 are now closed, the air valve 74 is opened and air is passed as described through the liquid in the tanks for a period to obtain the desired purification in the tank 45.

At this point the operating cycle of the apparatus may be considered to be finished.

To start a new cycle, the air valve 74 is again closed, the valves 66, 14, 22, 37 and 52 are opened and a new batch of effluent is fed into tank 15, while a purified batch of liquid, having the activated sludge entrained therewith, will pass into the settling tank 60.

From the description given it will be noted that successive batches of primary effluent and activated sludge are fed to the first tank of the series and batches of purified liquid and activated sludge of similar volume are at the same time withdrawn from the last tank of the series. The batches being progressively purified as they pass through successive tanks in the series.

It will also be noted that the air passing through the first tank 12 is fresh or normal air, and that the air passing through the second tank 32 is "conditioned" air or air which is "altered" by having a different percentage make-up and/or different components than the original normal air, this difference being due to the passage of the air through the first tank. For the same reason the air passing through the third tank is also "conditioned" as described. The term "gaseous mixture" as used herein refers to and defines air in its normal state and also air which has been "conditioned" or "altered" by passage through a body of effluent.

One of the principal objects of this invention is the building up of a vigorous culture of activated sludge during the process, and thus secure a condition of the sludge in the settling tanks which is ideal for seeding the fresh untreated effluent.

From experience it has been found that the liquid is practically in a purified state when it enters the last tank of the series and thus the work of this final tank is directly chiefly to invigorating the bacterial content of the sludge.

In order to secure a continuous flow of primary effluent from the mixing channel, and a continuous flow of purified liquid into the settling tanks—duplicate apparatus may be provided as shown in plan view in Fig. 1. During the period in which the liquid in one series of tanks is undergoing treatment, the primary effluent will be flowing into the first tank of the other series and purified liquid will be flowing out of the last tank. This condition alternates between the series and results in a continuous flow from the mixing channel to the settling tanks.

As described, it will be noted that the pressure which will build up in the air dome 92 in the top of the tank 30 need be just sufficient to overcome the pressure due to the head of liquid in tank 45, in order to secure the passage of air through the pipe 81 and the leg 77 in tank 45. Similarly, in order to secure a flow of air through the tank 30 from the air dome 91 in the top of the tank 15 the pressure in tank 15 must overcome the pressure due to the head of liquid in tank 30 plus pressure existing on top of the liquid. If, for example, the liquid head in the tanks is about ten feet, the pressure in the air dome 92 will be approximately five pounds per square inch and the pressure in the air dome 91 will be approximately ten pounds per square inch. If the valve 84 is open to the atmosphere as above described it is obvious there will be atmospheric pressure in the air dome 93 in the top of the tank 45.

Since the quantity of gas which may be dissolved or absorbed in a liquid varies with the pressure of the gas above the liquid it may be desirable, under certain conditions, to increase the air pressure in one or more of the tanks. To secure this result, a loaded exhaust valve, of conventional design, like that shown in Fig. 5 may be substituted for the plain valve 84, and the loading adjusted to give any desired pressure in the air dome 93 at the top of the tank 45. Any increase in the pressure in the tank 45 will, of course, require and result in correspondingly increased pressure in the tanks 30 and 15.

Figure 5:
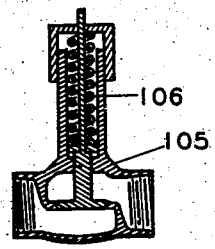
Fig. 5 is a spring loaded pressure relief valve adapted to be used in connection with this invention.

Should it be desired to maintain only the first tank of the series under higher pressure this result can be obtained by substituting a loaded valve, like that of Fig. 5, for the valve 80 between the first and second tanks of the series. Substituting the valve 82 with a loaded valve will increase the pressure in the first two tanks of the series.

Figure 4:
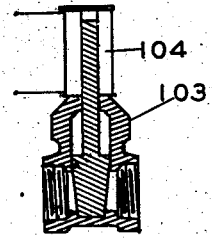
Fig. 4 is an automatic solenoid operated valve to be used in connection with this invention.

In order to cut down the operating labor and to render the apparatus practically automatic the valves 74, 14, 22, 37, 52 and 66 may be replaced with electrically operated solenoid valves of conventional type as shown in Fig. 4, or replaced by the equivalent of such a valve. If such automatic valves are used, they will be controlled by means of a conventional timing apparatus which will open and close the valves periodically as required to carry out the steps of the method. The sludge pump 67 will, of course, be controlled by the same timing apparatus.

Figure 3:
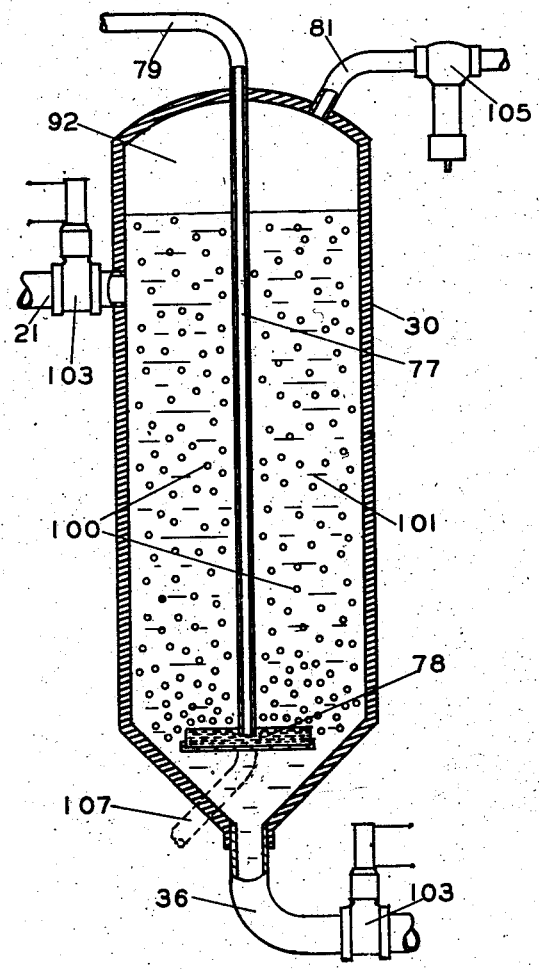
Fig. 3 is a vertical cross section through one of the intermediate tanks equipped with automatic control.

Fig. 3 shows an aerating tank equipped with automatic control. The liquid supply line 21 and the liquid discharge line 36 being each provided with an electrically controlled valve 103. The air exhaust line 81 is shown as provided with a loaded relief valve 105. In this figure the air bubbles 100 are shown as passing upwardly through the liquid 101.

If desired, the air admission line 79 may enter the tank near its lower end as shown by broken lines at 107.

The solenoid operated valve 103 shown in Fig. 4 is operated by reversing the direction of the current through the coil 104, in the well known manner.

The loaded relief valve 105 shown in Fig. 5 is adjusted by varying the compression of the spring 106.

It will be understood that two or any greater number of tanks may be used in one series. The quantity of air forced through the tanks varying with the total volume of liquid being treated in the series.

It will be understood that the pipe sizes and valve openings are adjusted to permit the entry of a new batch into the tank 15 within the desired period of time.

It will be understood that the purified liquid is drawn off from the settling tank 60 through the outlet 61 to permit successive batches to be emptied into the tank 60.

If desired, in transferring batches, the valve 14 may be kept closed and the air valves 80, 82 and 84 may also be closed, and the air valve 74 opened. This will result in building up pressure in the tank 15 and serve to rapidly force the liquid in this tank through the pipe 21 into the tank 30. The entry of this batch of liquid into the tank 30 will in turn force liquid into the tanks 45 and 60, to the end that the new batch may be placed in the apparatus in a short time.

It will be understood that pipe connections and valves, in addition to those shown, may be provided to enable any one of the tanks in a series to be by-passed for cleaning, repair or other purpose.

I claim:

1. Apparatus to treat sewage effluent comprising a primary effluent channel; a series of closed aerating tanks to hold batches of effluent for treatment; a settling basin for activated sludge and an outlet from said basin for purified liquid; a pump and pipe means to mix activated sludge from said basin with the effluent in said channel; a valved passage between said channel and the first tank; a valved passage leading from the bottom of each tank to a point near the top of the next tank in the series; a valved passage leading from the bottom of the last tank to a point near the top of said basin; said passages being closed to retain isolated batches of effluent, for an aeration and reaction period, in each of said tanks and said passages being opened to provide for the passage of each batch of effluent from each tank to the successive tank in the series and finally to said basin; and aerating means comprising air pipes between and within the tanks to provide for the passage of air during the reaction periods, through the effluent isolated in the first tank and thereafter progressively through the effluent isolated in each of the successive tanks in the series.

2. An apparatus to purify sewage effluent comprising a series of closed pressure holding aerating tanks; valved pipe connections between the bottom of one tank and the top of the next succeeding tank in the series: said valves being closed to isolate for treatment a batch of effluent in each tank of said series; said valves being opened and said pipe connections being arranged to provide passage for the movement of each batch of effluent progressively through said series of tanks and means to feed air progressively through the effluent treated in each tank.

3. An apparatus to purify sewage effluent comprising a series of closed pressure holding tanks; valved pipe connections between the bottom of one tank and the top of the next succeeding tank in the series: said valves being closed to isolate for treatment a batch of effluent in each tank of said series; said valves being opened and said pipe connections being arranged to provide passage for the movement of each batch of effluent progressively through said series of tanks and means to feed a gaseous mixture, of altered composition, through the effluent isolated in each tank.

CHESTER F. PROUDMAN.